US012648499B2

(12) United States Patent
Schroeder

(10) Patent No.: US 12,648,499 B2
(45) Date of Patent: Jun. 9, 2026

(54) SYSTEM AND METHOD FOR DETECTING DISK BLADE BEARING FAILURE ON AN AGRICULTURAL IMPLEMENT

(71) Applicant: CNH Industrial America LLC, New Holland, PA (US)

(72) Inventor: Brittany Schroeder, Bunker Hill, IN (US)

(73) Assignee: CNH Industrial America LLC, New Holland, PA (US)

( * ) Notice: Subject to any disclaimer, the term of this patent is extended or adjusted under 35 U.S.C. 154(b) by 510 days.

(21) Appl. No.: 18/134,953

(22) Filed: Apr. 14, 2023

(65) Prior Publication Data

US 2024/0341213 A1 Oct. 17, 2024

(51) Int. Cl.
| | |
|---|---|
| *A01B 71/04* | (2006.01) |
| *A01B 33/12* | (2006.01) |
| *A01B 61/04* | (2006.01) |
| *A01B 63/111* | (2006.01) |

(52) U.S. Cl.
CPC ............. *A01B 61/04* (2013.01); *A01B 33/12* (2013.01); *A01B 63/1115* (2013.01); *A01B 71/04* (2013.01)

(58) Field of Classification Search
CPC ......... A01B 15/02; A01B 15/16; A01B 15/20; A01B 23/02; A01B 23/06; A01B 35/28; A01B 35/32; A01B 71/08; A01B 71/04; A01B 61/04; A01B 61/00; A01B 63/00; A01B 63/24
See application file for complete search history.

(56) References Cited

U.S. PATENT DOCUMENTS

| | | | |
|---|---|---|---|
| 6,778,894 B2 | 8/2004 | Beck et al. | |
| 10,773,665 B2 | 9/2020 | Foster et al. | |
| 11,419,254 B2 * | 8/2022 | Barrick ................ | A01B 63/111 |
| 11,558,990 B2 * | 1/2023 | Henry .................... | A01B 71/08 |
| 11,650,095 B2 * | 5/2023 | Henry .................... | A01B 63/24 |
| | | | 172/1 |
| 11,898,931 B2 * | 2/2024 | Schroeder ............. | G01M 13/04 |
| 2020/0390024 A1 * | 12/2020 | Naylor ................... | G01S 17/87 |
| 2021/0045278 A1 * | 2/2021 | Henry .................... | A01B 9/003 |

(Continued)

FOREIGN PATENT DOCUMENTS

| | | | | | |
|---|---|---|---|---|---|
| CN | 115486216 A | * | 12/2022 | ............. | A01B 35/08 |
| WO | WO-2021028849 A1 | * | 2/2021 | ........... | A01B 63/112 |
| WO | WO 2022/162899 A1 | | 8/2022 | | |

*Primary Examiner* — Adam J Behrens
(74) *Attorney, Agent, or Firm* — Dority & Manning. P.A.

(57) ABSTRACT

An agricultural implement includes a disk blade assembly including a hanger, a first disk blade, and a second disk blade. Furthermore, the agricultural implement includes a fastener coupling the hanger to a frame member of the agricultural implement. Additionally, the agricultural implement includes a first load sensor configured to generate data indicative of a first load applied to the fastener at a forward side of the frame member by the disk blade assembly. Moreover, the agricultural implement includes a second load sensor configured to generate data indicative of a second load applied to the fastener at the aft side of the frame member by the disk blade assembly. In addition, the agricultural implement includes a computing system configured to determine when at least one of a first disk blade bearing or a second disk blade bearing has failed based on the data generated by the first and second load sensors.

20 Claims, 6 Drawing Sheets

(56)     References Cited

U.S. PATENT DOCUMENTS

| | | | |
|---|---|---|---|
| 2021/0100154 A1* | 4/2021 | Henry ................. | A01B 21/086 |
| 2021/0131856 A1 | 5/2021 | Henry | |
| 2022/0304213 A1 | 9/2022 | Schroeder | |
| 2022/0304214 A1* | 9/2022 | Schroeder ............ | A01B 63/112 |
| 2023/0081565 A1* | 3/2023 | Kovach ................... | A01B 5/04 |
| | | | 172/520 |
| 2023/0175923 A1* | 6/2023 | Schroeder ............ | G01M 13/04 |
| | | | 702/34 |

* cited by examiner

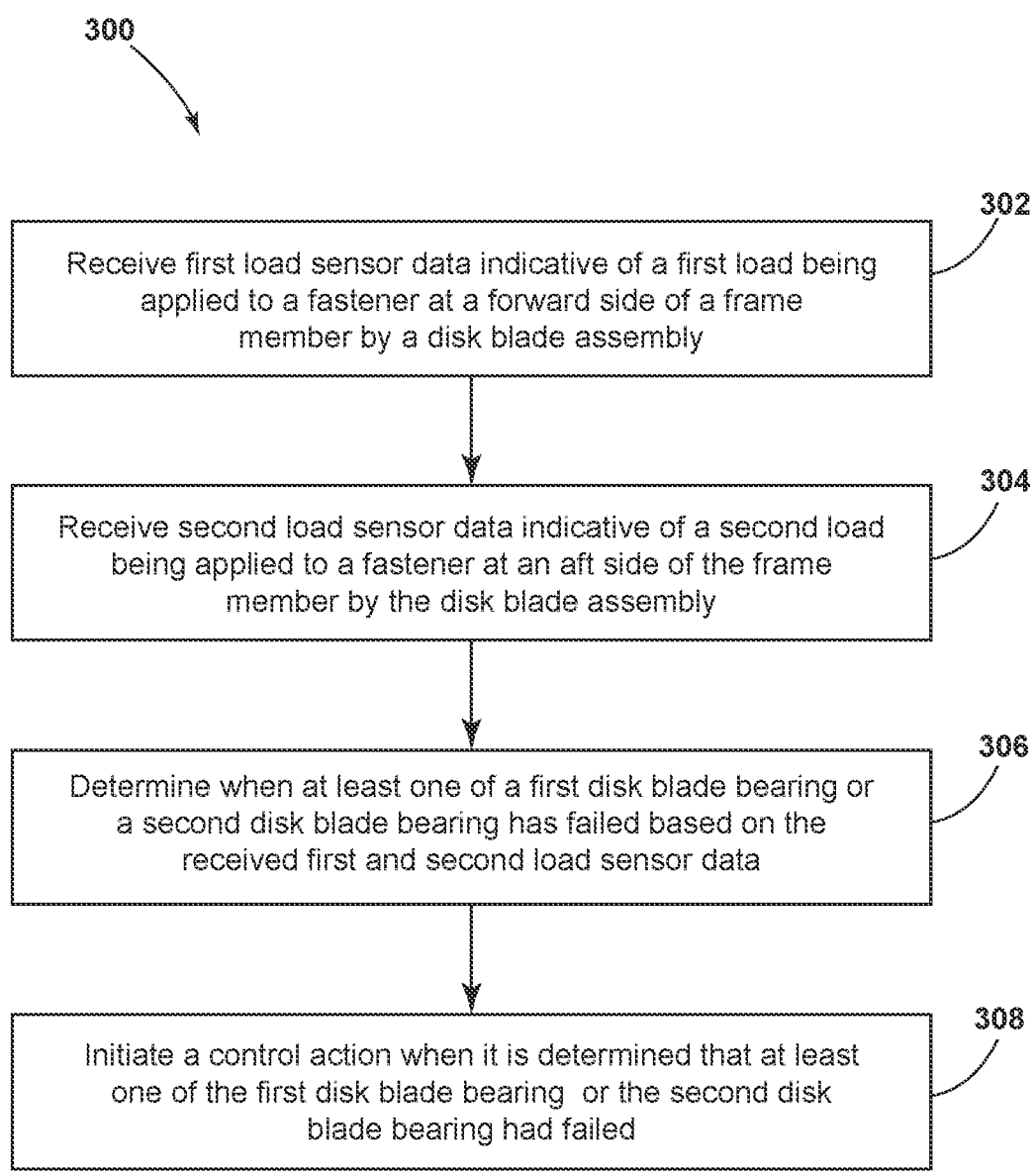

300

302
Receive first load sensor data indicative of a first load being applied to a fastener at a forward side of a frame member by a disk blade assembly 304
Receive second load sensor data indicative of a second load being applied to a fastener at an aft side of the frame member by the disk blade assembly 306
Determine when at least one of a first disk blade bearing or a second disk blade bearing has failed based on the received first and second load sensor data 308
Initiate a control action when it is determined that at least one of the first disk blade bearing or the second disk blade bearing had failed

FIG. 6

SYSTEM AND METHOD FOR DETECTING DISK BLADE BEARING FAILURE ON AN AGRICULTURAL IMPLEMENT

FIELD OF THE INVENTION

The present disclosure generally relates to agricultural implements and, more particularly, to a system and a method for detecting disk blade bearing failure on an agricultural implement.

BACKGROUND OF THE INVENTION

It is well known that, to attain the best agricultural performance from a piece of land, a farmer must cultivate the soil, typically through a tillage operation. Common tillage operations include plowing, harrowing, and sub-soiling. Modern farmers perform these tillage operations by pulling a tillage implement behind an agricultural work vehicle, such as a tractor. Depending on the crop selection and the soil conditions, a farmer may need to perform several tillage operations at different times over a crop cycle to properly cultivate the land to suit the crop choice.

In some configurations, a tillage implement includes a plurality of disk blades, such as leveling blades, supported on its frame. Each disk blade includes one or more bearings that couple the disk blade to a hanger and allow the disk blade to easily rotate relative to the soil. As such, as the tillage implement travels across the field to perform a tillage operation thereon, the disk blades rotate relative to the soil to flatten soil ridges created by a plurality of shanks supported on the tillage implement frame.

After repeated tillage operations and disk blade use, the disk blade bearings may begin to wear and eventually fail/stop working. A failed bearing may hinder the disk blade from rotating or prevent the disk blade from rotating entirely. A failed disk blade bearing may, in turn, negatively impact the quality of the tillage operation being performed and should be replaced as soon as possible. Unfortunately, it can be difficult for an operator to notice a disk blade bearing failure during a tillage operation as the frame and/or the wheels of the tillage implement and/or the associated agricultural work vehicle may block the operator's view of the disk blades.

Accordingly, a system and method for detecting disk blade bearing failure on an agricultural implement would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to an agricultural implement. The agricultural implement includes a frame extending in a longitudinal direction between a forward end of the frame and an aft end of the frame. The frame further extends in a lateral direction between a first side of the frame and a second side of the frame. Furthermore, the frame includes a frame member. Additionally, the agricultural implement includes a disk blade assembly supported on the frame, with the disk blade assembly including a hanger coupled to the frame member and a first disk blade and a second disk blade rotatably coupled to the hanger. Moreover, the agricultural implement includes a fastener coupling the hanger to the frame member. In addition, the agricultural implement includes a first load sensor in operative association with the fastener, with the first load sensor configured to generate data indicative of a first load being applied to the fastener at a forward side of the frame by the disk blade assembly. Furthermore, the agricultural implement includes a second load sensor in operative association with the fastener, with the second load sensor configured to generate data indicative of a second load being applied to the fastener at an aft side of the frame by the disk blade assembly. Additionally, the agricultural implement includes a computing system communicatively coupled to the first and second load sensors. In this respect, the computing system is configured to determine when at least one of a first disk blade bearing or a second disk blade bearing has failed based on the data generated by the first and second load sensors.

In another aspect, the present subject matter is directed to a system for detecting disk blade bearing failure on an agricultural implement. The system includes a disk blade assembly configured to be supported on a frame member of a frame of the agricultural implement. The frame, in turn, extends in a longitudinal direction between a forward end of the frame and an aft end of the frame. The frame further extends in a lateral direction between a first side of the frame and a second side of the frame. Furthermore, the disk blade assembly includes a hanger coupled to the frame member and a first disk blade and a second disk blade rotatably coupled to the hanger. Additionally, the system includes a fastener configured to couple the hanger to the frame member. Moreover, the system includes a first load sensor in operative association with the fastener, with the first load sensor configured to generate data indicative of a first load being applied to the fastener at a forward side of the frame by the disk blade assembly. In addition, the system includes a second load sensor in operative association with the fastener, with the second load sensor configured to generate data indicative of a second load being applied to the fastener at an aft side of the frame by the disk blade assembly. Furthermore, the system includes a computing system communicatively coupled to the first and second load sensors. As such, the computing system is configured to determine when at least one of a first disk blade bearing or a second disk blade bearing has failed based on the data generated by the first and second load sensors.

In a further aspect, the present subject matter is directed to a method for detecting disk blade bearing failure on an agricultural implement. The agricultural implement, in turn, includes a disk blade assembly supported on a frame member of the agricultural implement, with the disk blade assembly including a hanger and a first disk blade and a second disk blade rotatably coupled to the hanger. The agricultural implement further includes a fastener coupling the hanger to the frame member. The method includes receiving, with a computing system, first load sensor data indicative of a first load being applied to the fastener at a forward side of the frame by the disk blade assembly. Furthermore, the method includes receiving, with the computing system, second load sensor data indicative of a second load being applied to the fastener at an aft side of the frame by the disk blade assembly. Additionally, the method includes determining, with the computing system, when at least one of a first disk blade bearing or a second disk blade bearing has failed based on the received first and second load sensor data. Moreover, the method includes initiating, with the computing system, a control action when it is determined that at least one of the first disk blade bearing or the second disk blade bearing has failed.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which:

FIG. 6 illustrates a flow diagram of one embodiment of a method for detecting disk blade bearing failure on an agricultural implement in accordance with aspects of the present subject matter.

Figure 1:
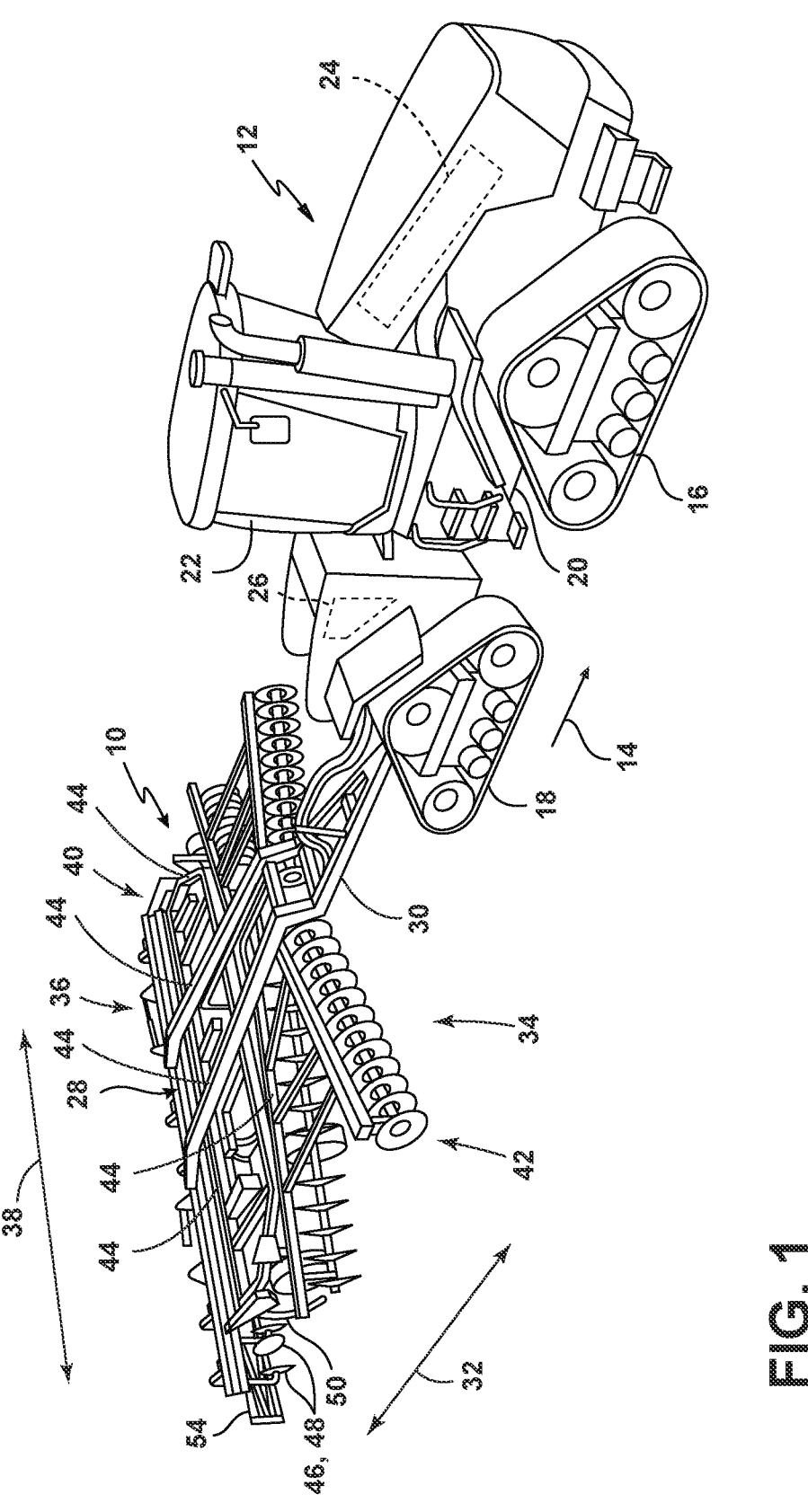
FIG. 1 illustrates a perspective view of one embodiment of an agricultural implement and an associated agricultural work vehicle in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield still a further embodiment. Thus, it is intended that the present invention covers such modifications and variations as come within the scope of the appended claims and their equivalents.

In general, the present subject matter is directed to a system and a method for detecting disk blade bearing failure on an agricultural implement. As will be described below, the agricultural implement includes a disk blade assembly supported on its frame. The disk blade assembly, in turn, includes a hanger and a first disk blade rotatably coupled to the hanger via a first disk blade bearing, and a second disk blade rotatably coupled to the hanger via a second disk blade bearing. Furthermore, the agricultural implement includes a fastener (e.g., U-bolt) coupling the hanger to the frame. For example, the fastener may extend in a longitudinal direction across the top surface of a frame member from a forward side of the frame member to an aft side of the frame member.

In several embodiments, a computing system of the disclosed system is configured to determine when at least one of a first disk blade bearing or a second disk blade bearing has failed based on the loads applied to the fastener. Specifically, in such embodiments, the system includes a first load sensor configured to generate data indicative of a first load being applied to the fastener at a forward side of the frame by the disk blade assembly. Additionally, the system includes a second load sensor configured to generate data indicative of a second load being applied to the fastener at an aft side of the frame by the disk blade assembly. In this respect, the computing system is configured to receive the data generated by the first and second load sensors during operation of the agricultural implement. Moreover, the computing system is configured to determine when at least one of a first disk blade bearing or a second disk blade bearing has failed based on received sensor data. For example, in some embodiments, the computing system may determine first and second magnitudes of the first and second loads acting on the fastener in the longitudinal direction based on the received sensor data. As such, the computing system may determine a differential load between the first and second magnitudes. Thereafter, when the differential load falls below a threshold value, the computing system may determine that the first disk blade bearing has failed. Conversely, when the differential load exceeds the threshold value, the computing system may determine that the second disk blade bearing has failed.

Determining when the disk blade bearings of an agricultural implement have failed based on the loads applied to the fasteners coupling the associated disk blade assembly(ies) to the frame improves the operation of the agricultural implement. More specifically, during normal, unworn/unfailed operation of a disk blade bearing, the forces applied to the fasteners coupling the associated disk blade assembly(ies) to the frame are oriented downward in the vertical direction. However, when a disk blade with a failed disk blade bearing moves through the soil, horizontal forces in the longitudinal direction are exerted on the fasteners. The magnitude and the direction of such forces in the longitudinal direction are indicative of the direction and severity of the wear or failure. As such, by monitoring the loads being applied to the fasteners coupling the disk blade assembly(ies) of an agricultural implement to its frame, the disclosed system and method can automatically determine when the disk blade bearings of the agricultural implement have failed. Thus, the disclosed system and method can notify the operator and/or initiate other control actions (e.g., reducing ground speed) immediately upon failure of a disk blade bearing and without the need for the operator to notice such failure, thereby improving the quality of the operation being performed by the agricultural implement.

Referring now to the drawings, FIG. 1 illustrates a perspective view of one embodiment of an agricultural implement 10 and an associated agricultural work vehicle 12 in accordance with aspects of the present subject matter. In general, the agricultural implement 10 is configured to be towed across a field by the agricultural work vehicle 12 in a direction of travel (indicated by arrow 14). For example, in one embodiment, the agricultural implement 10 is configured as a tillage implement (e.g., a disk ripper) and the agricultural work vehicle 12 is configured as an agricultural tractor. However, in other embodiments, the agricultural implement 10 may be configured as any other suitable agricultural implement, such as another type of tillage implement, a seeder, planter, nutrient applicator, etc. Similarly, the agricultural work vehicle 12 may be configured as any other suitable agricultural work vehicle, such as an agricultural harvester, a self-propelled sprayer, etc.

As shown, the agricultural work vehicle 12 includes a pair of front track assemblies 16, a pair of rear track assemblies 18, and a frame or chassis 20 coupled to and supported by the track assemblies 16, 18. However, in other embodiments, the agricultural work vehicle 12 may include any other type of traction devices, such as wheels or tires. An operator's cab 22 may be supported by a portion of the chassis 20 and may house various input devices (e.g., a user interface) for permitting an operator to control the operation of one or more components of the agricultural work vehicle 12 and/or one or more components of the agricultural implement 10. Furthermore, the agricultural work vehicle 12 includes an engine 24 and a transmission 26 mounted on the chassis 20. The transmission 26 may be operably coupled to the engine 24 and may provide variably adjusted gear ratios for transferring engine power to the track assemblies 16, 18 via a drive axle assembly (not shown) (or via axles if multiple drive axles are employed).

Additionally, the agricultural implement 10 includes a frame 28 configured to be towed by the agricultural work vehicle 12 via a pull hitch or tow bar 30 in the direction of travel 14. As shown, the frame 28 extends in a longitudinal direction 32 between a forward end 34 of the frame 28 and an aft end 36 of the frame 28. The frame 28 also extends in a lateral direction 38 between a first side 40 of the frame 28 and a second side 42 of the frame 28. In general, the frame 28 may include a plurality of frame members 44, such as beams, bars, and/or the like, configured to support or couple to a plurality of components.

Moreover, the frame 28 may be configured to support a plurality of ground-engaging and/or ground-penetrating tools, such as a plurality of shank assemblies, disk blade assemblies (e.g., leveling blade assemblies), basket assemblies, tines, spikes, and/or the like. In one embodiment, the various ground-engaging and/or ground-penetrating tools may be configured to perform a tillage operation or any other suitable ground-engaging operation on the field across which the agricultural implement 10 is being towed. For example, in the illustrated embodiment, the frame 28 is configured to support various disk blade assemblies 46, such as leveling blade assemblies. The frame 28 is also configured to support a plurality of shank assemblies 50 and a plurality of crumbler wheels or basket assemblies 54. However, in alternative embodiments, the frame 28 may be configured to support any other suitable ground-engaging tool(s), ground-penetrating tool(s), or combinations of such tools.

Figure 2:
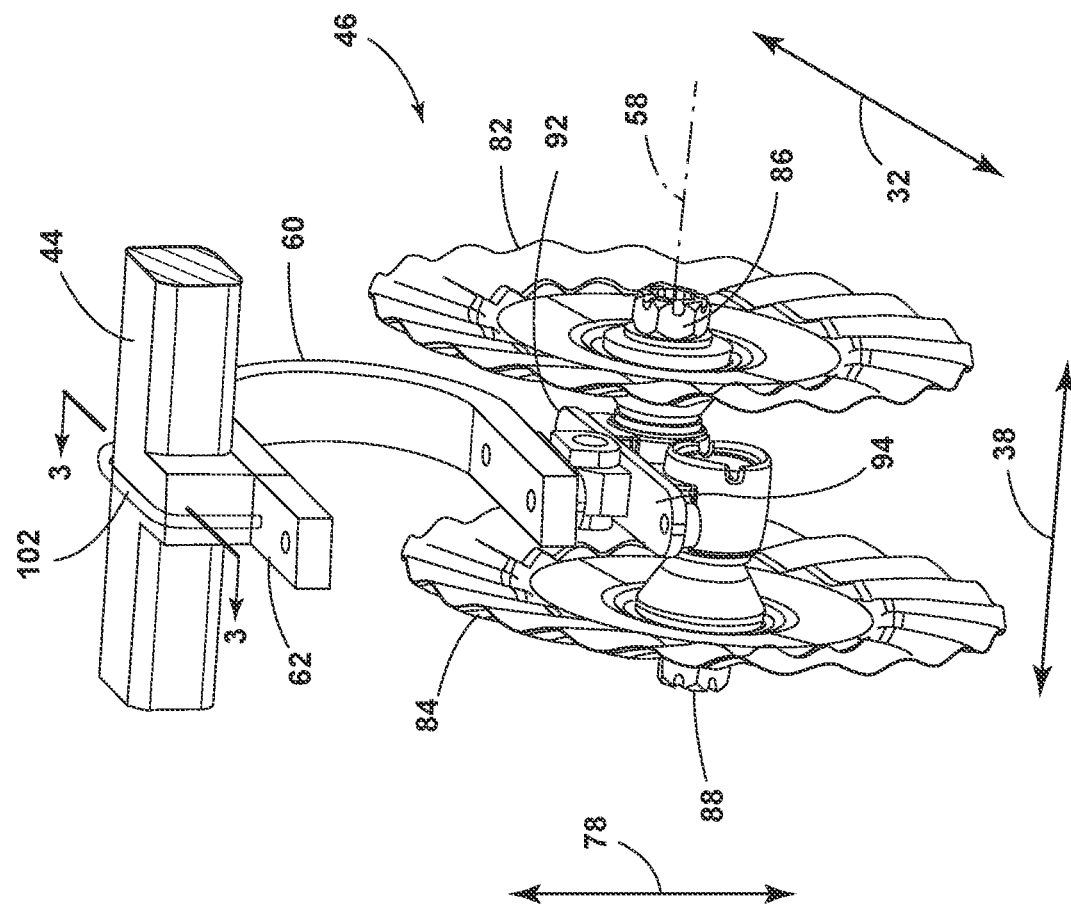
FIG. 2 illustrates a perspective view of one embodiment of a disk blade assembly of an agricultural implement in accordance with aspects of the present subject matter.

FIG. 2 illustrates a perspective view of one of the disk blade assemblies 46 configured as a leveling blade assembly. As shown, in several embodiments, the disk blade assembly 46 includes a plurality of disk blades (e.g., leveling blades), such as a first disk blade 82 and a second disk blade 84. Each disk blade 82, 84 is rotatably supported by a respective disk blade bearing such that each disk blade 82, 84 rotates relative to a hanger 60. For example, the first disk blade 82 is supported by a first disk blade bearing 86 and the second disk blade 84 is supported by a second disk blade bearing 88. Specifically, in such embodiments, each disk blade bearing 86, 88 allows each disk blade 82, 84 to be rotatably coupled to the disk blade assembly 46. As such, each disk blade 82, 84 is generally configured to rotate about an axis 58 defined by each respective disk blade bearing 86, 88. Therefore, each disk blade 82, 84 may rotate independently about the axis 58 relative to each other disk blade 82, 84. However, in alternative embodiments, the disk blade assembly 46 may be configured in any other suitable manner. For example, in one embodiment, the disk blade assembly 46 may include only a single disk blade such as the first disk blade 82.

Furthermore, the disk blade assembly 46 includes the hanger 60 that is rotatably coupled to the disk blades 82, 84. More specifically, the hanger 60 is configured to support the disk blades 82, 84 relative to the frame member 44. In this respect, the hanger 60 is coupled at one end to the frame member 44 via the fastener 102. For example, as will be described below, the hanger 60 may be coupled to a mounting bracket 62, with the fastener 102 coupling the mounting bracket 62 to the frame member 44. Additionally, the hanger 60 is rotatably coupled at the opposite end to the disk blades 82, 84, such as via the disk blade bearings 86, 88. In particular, the hanger 60 includes a forward arm 92 and an aft arm 94 separated from the forward arm 92 along the longitudinal direction 32 and the lateral direction 38. The forward arm 92 of the hanger 60 is rotatably coupled to the first disk blade 82 via the first disk blade bearing 86. Likewise, the aft arm 94 of the hanger 60 is rotatably coupled to the second disk blade 84 via the second disk blade bearing 88. As such, the first disk blade 82 is spaced apart from the second disk blade 84 along the longitudinal direction 32 and the lateral direction 38. In the illustrated embodiment, the hanger 60 defines a C-shape that permits the disk blades 82, 84 mounted thereon to move relative to the frame member 44. However, in alternative embodiments, the hanger 60 may have any other suitable configuration. Moreover, although the illustrated disk blade assembly 46 includes one hanger 60, the disk blade assembly 46 may have any other suitable number of hangers 60.

During an agricultural operation (e.g., a tillage operation), the disk blades 82, 84 penetrate the soil and rotate relative to the soil as the agricultural implement 10 is towed across the field. Over time, repeated usage of the disk blades 82, 84 exposes the disk blade bearings 86, 88 to repeated loading and/or strain. As such, the disk blade bearings 86, 88 tend to wear and eventually fail because of repeated loading and/or strain. As will be described below, the system and method disclosed herein will automatically detect when a disk blade bearing has failed and alert the operator to the failed disk blade bearing.

Figure 3:
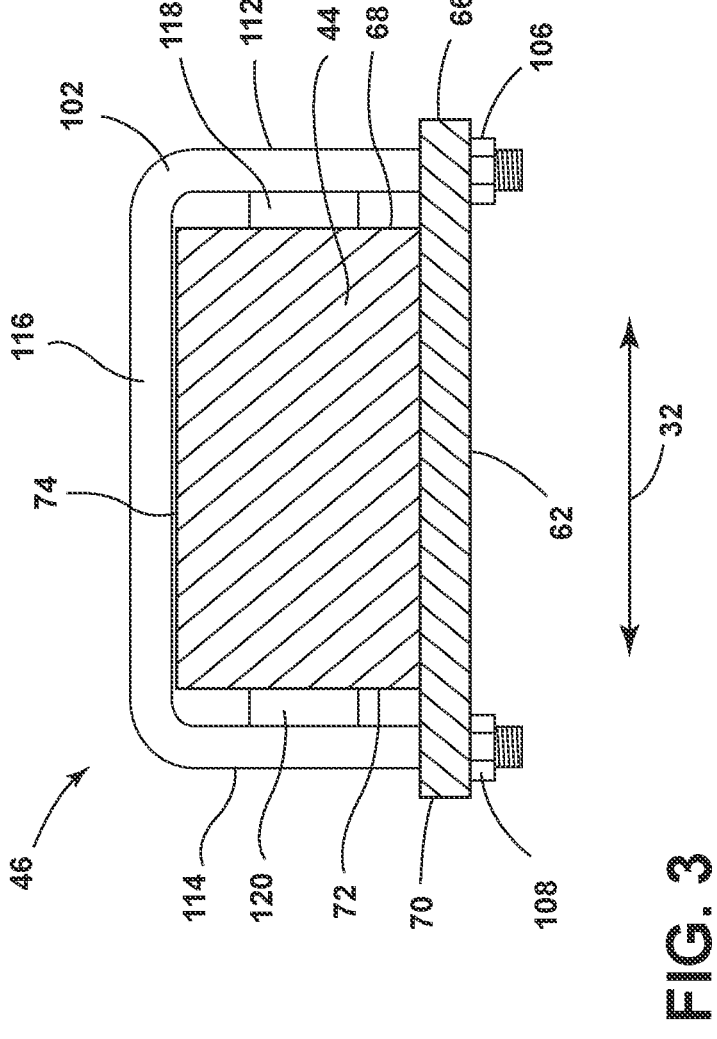
FIG. 3 illustrates a cross-sectional view of the disk blade assembly taken generally about Line 3-3 in FIG. 2, particularly illustrating the fasteners coupling the disk blade assembly to a frame member of the agricultural implement.

FIG. 3 illustrates a cross-sectional view of the disk blade assembly 46 taken generally about Line 3-3 in FIG. 2, with the disk blades 82, 84 and the hanger 60 removed for clarity. As shown, the mounting bracket 62 is coupled to one of the frame members 44 via the fastener 102 thereby mounting the disk blade assembly 46 on the frame 28 (FIG. 1). Specifically, in several embodiments, the mounting bracket 62 includes a forward portion 66 positioned adjacent to a forward side 68 of the frame member 44. Moreover, in such embodiments, the mounting bracket 62 includes an aft portion 70 positioned adjacent to an aft side 72 of the frame member 44. However, in alternative embodiments, the mounting bracket 62 of the disk blade assembly 46 may have any other suitable configuration that allows for coupling to the frame member 44 via the fastener 102.

Furthermore, the fastener 102 extends between the forward and aft portions 66, 70 of the mounting bracket 62 to couple the disk blade assembly 46 to the frame member 44. Specifically, in several embodiments, the fastener 102 extends in the longitudinal direction 32 across a top surface 74 of the frame member 44 from the forward side 68 to the aft side 72. Thus, the fastener 102 generally supports the disk blade assembly 46 relative to the frame 28.

In the illustrated embodiment, the fastener 102 is configured as a U-bolt. In such an embodiment, the fastener 102 includes a forward side 112, an aft side 114, and a top side 116. As such, the fastener 102 wraps around the forward side 68, the top surface 74, and the aft side 72 of the frame member 44 such that the forward side 112 of the fastener 102 is adjacent to the forward side 68 of the frame member 44, the aft side of the fastener 102 is adjacent to the aft side 72 of the frame member 44, and the top side 116 of the fastener 102 is adjacent to the top surface 74 of the frame member 44. Moreover, in such embodiments, the fastener 102 may extend through the mounting bracket 62. As such, first and second nuts 106, 108 may threadingly engage the portions of the fastener 102 positioned beneath the mounting bracket 62 on the forward side 68 and aft side 72 of the frame member 44, respectively, to secure the mounting bracket 62 to the frame member 44. However, in alternative embodiments, the fastener 102 may be configured as any other suitable type of fastener.

It should be further appreciated that the configuration of the agricultural implement 10 and the agricultural work vehicle 12 described above and shown in FIGS. 1-3 is provided only to place the present subject matter in an exemplary field of use. Thus, it should be appreciated that the present subject matter may be readily adaptable to any manner of agricultural implement and/or agricultural work vehicle configuration.

Additionally, as shown in FIG. 3, the agricultural implement 10 includes first and second load sensors 118, 120. More specifically, the first and second load sensors 118, 120 are in operative association with the fastener 102. As such, the first load sensor 118 is configured to generate data indicative of a first load being applied to the fastener 102 at the forward side 68 of the frame member 44 by the disk blade assembly 46. In this respect, the first load sensor 118 may be located at the forward side 68 of the frame member 44. For example, the first load sensor 118 may be coupled between the fastener 102 and the frame member 44 on the forward side 68 of the frame member 44. Similarly, the second load sensor 120 is configured to generate data indicative of a second load being applied to the fastener 102 at the aft side 72 of the frame member 44 by the disk blade assembly 46. In this respect, the second load sensor 120 may be located on the aft side 72 of the frame member 44. For example, the second load sensor 120 may be coupled between the fastener 102 and the frame member 44 on the aft side 72 of the frame member 44. As will be described below, the data generated by the first and second load sensors 118, 120 is used to determine when at least one of the first disk blade bearing 86 or the second disk blade bearing 88 has failed.

The first and second load sensors 118, 120 may be configured as any suitable sensors or sensing devices configured to generate data indicative of the loads being applied to or otherwise acting on the fastener 102. For example, in some embodiments, the first and second load sensors 118, 120 may be configured as first and second load cells, respectively. However, in alternative embodiments, the first and second load sensors 118, 120 may be configured as any other suitable type of sensors or sensing devices, such as load pins, strain gauges, etc.

Figure 4:
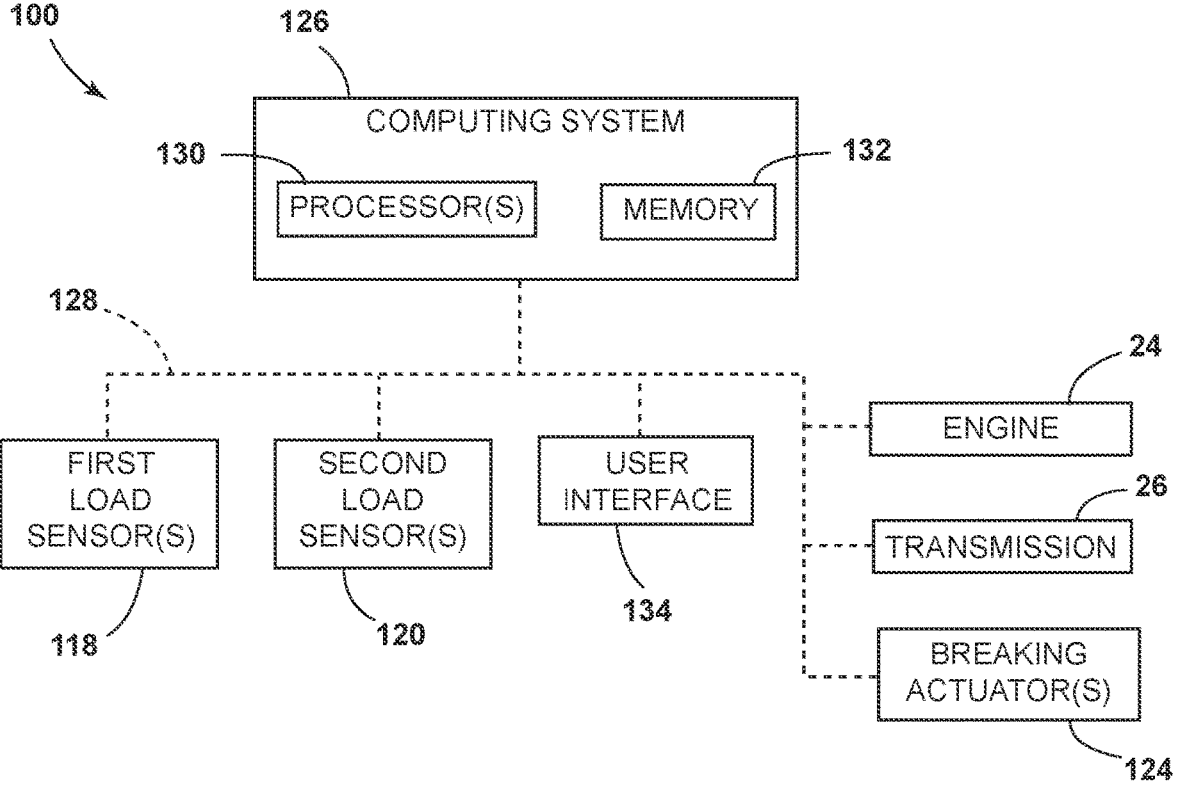
FIG. 4 illustrates a schematic view of one embodiment of a system for detecting disk blade bearing failure on an agricultural implement in accordance with aspects of the present subject matter.

Referring now to FIG. 4, a schematic view of one embodiment of a system 100 for detecting disk blade bearing failure on an agricultural implement is illustrated in accordance with aspects of the present subject matter. In general, the system 100 will be described herein with reference to the agricultural implement 10 and the agricultural work vehicle 12 described above with reference to FIGS. 1-3. However, it should be appreciated by those of ordinary skill in the art that the disclosed system 100 may generally be utilized with agricultural implements having any other suitable implement configuration and/or agricultural work vehicles having any other suitable vehicle configuration.

As shown in FIG. 4, the system 100 includes one or more components of the agricultural implement 10 and/or the agricultural work vehicle 12. For example, in the illustrated embodiment, the system 100 includes the engine 24, the transmission 26, the first load sensor(s) 118, and the second load sensor(s) 120.

Additionally, the system 100 may include one or more braking actuators 124 of the agricultural work vehicle 12. In general, when activated, the braking actuator(s) 124 may reduce the speed at which the agricultural work vehicle 12 moves across the field, such as by converting energy associated with the movement of the agricultural work vehicle 12 into heat. For example, in one embodiment, the braking actuator(s) 124 may correspond to a suitable hydraulic cylinder(s) configured to push a stationary frictional element(s) (not shown), such as a brake shoe(s) or a brake caliper(s), against a rotating element(s) (not shown), such as a brake drum(s) or a brake disc(s). However, in alternative embodiments, the braking actuator(s) 124 may be any other suitable hydraulic, pneumatic, mechanical, and/or electrical component(s) configured to convert the rotation of the rotating element(s) into heat. In addition, in embodiments in which speed control can be actuated by the throttle body position, the braking actuator(s) 124 may be omitted.

Moreover, the system 100 includes a computing system 126 communicatively coupled to one or more components of the agricultural implement 10, the agricultural work vehicle 12, and/or the system 100 to allow the operation of such components to be electronically or automatically controlled by the computing system 126. For instance, the computing system 126 may be communicatively coupled to the first and second load sensors 118, 120 via a communicative link 128. As such, the computing system 126 may be configured to receive data from the first and second sensors 118, 120 that is indicative of the loads being applied to the fasteners 102 coupling the disk blade assembly(ies) 46 to the frame 28. Furthermore, the computing system 126 may be communicatively coupled to the engine 24, the transmission 26, and/or the braking actuator(s) 124 via the communicative link 128. In this respect, the computing system 126 may be configured to control the operation of the engine 24, the transmission 26, and/or the braking actuator(s) 124 to adjust the ground speed at which the agricultural implement 10 travels across the field. In addition, the computing system 126 may be communicatively coupled to any other suitable components of the agricultural implement 10, the agricultural work vehicle 12, and/or the system 100.

In general, the computing system 126 may comprise one or more processor-based devices, such as a given controller or computing device or any suitable combination of controllers or computing devices. Thus, in several embodiments, the computing system 126 may include one or more processor(s) 130 and associated memory device(s) 132 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 132 of the computing system 126 may generally comprise memory element(s) including, but not limited to, a computer readable medium (e.g., random access memory RAM)), a computer readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 132 may generally be configured to store suitable computer-readable instructions that, when implemented by the processor(s) 130, configure the computing system 126 to perform various computer-implemented functions, such as one or more aspects of the methods and algorithms that will be described herein. In addition, the computing system 126 may also include various other suitable components, such as a communications circuit or module, one or more input/output channels, a data/control bus and/or the like.

The various functions of the computing system 126 may be performed by a single processor-based device or may be distributed across any number of processor-based devices, in which instance such devices may be considered to form part of the computing system 126. For instance, the functions of the computing system 126 may be distributed across multiple application-specific controllers or computing devices, such as a navigation controller, an engine controller, a transmission controller, an implement controller, and/or the like.

In addition, the system 100 may also include a user interface 134. More specifically, the user interface 134 may be configured to provide feedback from the computing system 126 (e.g., feedback associated with failure of the disk blade bearings 86, 88) to the operator. As such, the user interface 134 may include one or more feedback devices (not shown), such as display screens, speakers, warning lights, and/or the like, which are configured to provide feedback from the computing system 126 to the operator. As such, the user interface 134 may, in turn, be communicatively coupled to the computing system 126 via the communicative link 128 to permit the feedback to be transmitted from the computing system 126 to the user interface 134. Furthermore, some embodiments of the user interface 134 may include one or more input devices, such as touch-screens, keypads, touchpads, knobs, buttons, sliders, switches, mice, microphones, and/or the like, which are configured to receive inputs from the operator. In one embodiment, the user interface 134 may be mounted or otherwise positioned within the operator's cab 22 of the agricultural work vehicle 12. However, in alternative embodiments, the user interface 134 may mounted at any other suitable location.

Figure 5:
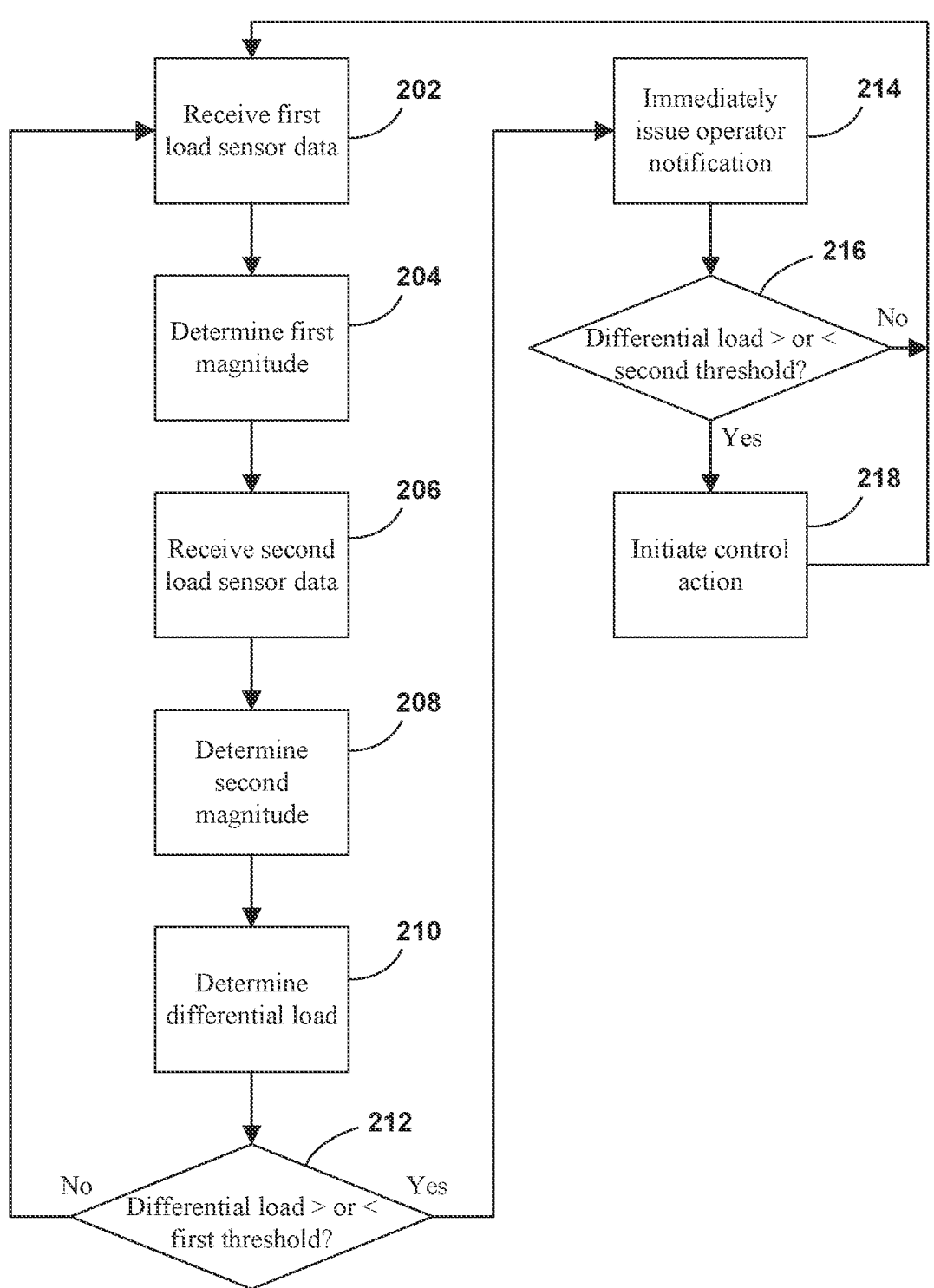
FIG. 5 illustrates a flow diagram providing one embodiment of control logic for detecting disk blade bearing failure on an agricultural implement in accordance with aspects of the present subject matter.

Referring now to FIG. 5, a flow diagram of one embodiment of example control logic 200 that may be executed by the computing system 126 (or any other suitable computing system) for detecting disk blade bearing failure on an agricultural implement is illustrated in accordance with aspects of the present subject matter. Specifically, the control logic 200 shown in FIG. 5 is representative of steps of one embodiment of an algorithm that can be executed to automatically detect disk blade bearing failure on an agricultural implement. Thus, in several embodiments, the control logic 200 may be advantageously utilized in association with a system installed on or forming part of an agricultural implement and/or an associated agricultural work vehicle to allow for real-time detection of disk blade bearing failure on an agricultural implement without requiring substantial computing resources and/or processing time. However, in other embodiments, the control logic 200 may be used in association with any other suitable system, application, and/or the like for detecting disk blade bearing failure on an agricultural implement.

As shown, at (202), the control logic 200 includes receiving first load sensor data indicative of a first load being applied to a fastener at a forward side of a frame member by a disk blade assembly of an agricultural implement. Specifically, as mentioned above, in several embodiments, the computing system 126 may be communicatively coupled to the first load sensor(s) 118 via the communicative link 128. In this respect, as the agricultural implement 10 is towed across the field by the agricultural work vehicle 12 to perform an agricultural operation (e.g., a tillage operation) thereon, the computing system 126 may receive data from the first load sensor(s) 118. Such first load sensor data may, in turn, be indicative of the load being applied to each fastener 102 at the forward side 68 of the frame member 44 of the agricultural implement 10 by the corresponding disk blade assembly 46.

Furthermore, at (204), the control logic 200 includes determining a first magnitude of the first load acting on the fastener in the longitudinal direction based on the received first load sensor data. Specifically, in several embodiments, the computing system 126 is configured to analyze the first load sensor data received at (202) to determine the first magnitude of the first load acting on the fastener 102 coupling each disk blade assembly 46 to the frame 28. For example, the computing system 126 may access a look-up table stored within its memory device(s) 132 that correlates the received first load sensor data to the corresponding first magnitude(s).

Moreover, at (206), the control logic 200 includes receiving second load sensor data indicative of a second load being applied to the fastener at an aft side of the frame member by the disk blade assembly. Specifically, as mentioned above, in several embodiments, the computing system 126 may be communicatively coupled to the second load sensor(s) 120 via the communicative link 128. In this respect, as the agricultural implement 10 is towed across the field by the agricultural work vehicle 12 to perform the agricultural operation, the computing system 126 may receive data from the second load sensor(s) 120. Such second load sensor data may, in turn, be indicative of the load being applied to each fastener 102 at the aft side 72 of the frame member 44 of the agricultural implement 10 by the corresponding disk blade assembly 46.

As will be described below, the first load sensor data received at (202) and the second load sensor data received at (206) are used to detect when the disk blade bearings 86, 88 of the agricultural implement 10 have failed. Specifically, in several embodiments, the first and second load sensors 118, 120 are configured as load cells. During normal, unworn/unfailed operation of the disk blade bearings 86, 88, an upward load in the vertical direction 78 is applied to the corresponding fastener 102 with an at most negligible load being applied in the longitudinal direction 32. However, when the disk blade bearings 86, 88 have failed, the corresponding disk blades 82, 84 experience resistance to normal rotation. As such, a load in the longitudinal direction 32 is applied to the fastener 102 at the forward side 68 of the frame member 44 when the first disk blade bearing 86 has failed. Likewise, a load in the longitudinal direction 32 is applied to the fastener 102 at the aft side 72 of the frame member 44 when the second disk blade bearing 88 has failed. The magnitude of the load being applied to the fastener 102 in the longitudinal direction 32 is, in turn, indicative of the magnitude of the wear of the first disk blade bearing 86 and/or the second disk blade bearing 88.

Additionally, at (208), the control logic 200 includes determining a second magnitude of the second load acting on the fastener in the longitudinal direction based on the received second load sensor data. Specifically, in several embodiments, the computing system 126 is configured to analyze the second load sensor data received at (206) to determine the second magnitude of the second load acting on the fastener 102 coupling each disk blade assembly 46 to the frame 28. For example, the computing system 126 may access a look-up table stored within its memory device(s) 132 that correlates the received second load sensor data to the corresponding second magnitude(s).

Moreover, at (210), the control logic 200 includes determining a differential load between the first magnitude and the second magnitude. For example, the differential load may be the second magnitude subtracted from the first magnitude or the first magnitude subtracted from the second magnitude. Specifically, in several embodiments, the computing system 126 is configured to calculate the difference between the first magnitude determined at (204) and the second magnitude determined at (208) to determine the differential load between the first magnitude and the second magnitude.

Furthermore, at (212), the control logic 200 includes comparing the differential load to a first threshold value. Specifically, in several embodiments, the computing system 126 is configured to compare each differential load determined at (210) to a first threshold value. When the differential load for a given fastener 102 falls below the first threshold value, the first disk blade bearing 86 has worn but not failed. For example, the first threshold value may correspond to a positive or a negative value such that when the differential load falls below the positive value or the negative value, the first disk blade bearing 86 has worn but not failed. Likewise, when the differential load for the given fastener 102 exceeds the first threshold value, the second disk blade bearing 88 has worn but not failed. For example, the first threshold value may correspond to a positive or a negative value such that when the differential load exceeds the positive value or the negative value, the second disk blade bearing 88 has worn but not failed. In such instances when at least one of the first disk blade bearing 86 or the second disk blade bearing 88 has worn, the control logic 200 (with respect to that corresponding disk blade 82, 84) proceeds to (214) at which the computing system 126 initiates notification of the operator of the agricultural implement immediately when it determines that the corresponding disk blade bearing 86, 88 has worn but not failed. Conversely, when the differential load does not fall below or exceed the first threshold value, the control logic 200 proceeds back to (202).

Moreover, at (214), the control logic 200 includes initiating notification of the operator of the agricultural implement immediately when the differential load falls below or exceeds the second threshold value. Upon completion of (214), the control logic 200 proceeds to (216).

Furthermore, at (216), if the comparison at (212) results in either the first disk blade bearing 86 or the second disk blade bearing 88 being worn, the control logic 200 includes comparing the differential load to a second threshold value that is greater than the first threshold value. Specifically, in several embodiments, the computing system 126 is configured to compare each differential load determined at (210) to the second threshold value. When the differential load for a given fastener 102 falls below the second threshold value, the first disk blade bearing 86 has failed. For example, the second threshold value may correspond to a positive or negative value such that when the differential load falls below the positive or negative value, the first disk blade bearing 86 has failed. Likewise, when the differential load for the given fastener 102 exceeds the second threshold value, the second disk blade bearing 88 has failed. For example, when the differential load exceeds the positive or negative value, the second disk blade bearing 88 has failed. Such positive and negative values will be greater than the positive and negative values of the first threshold value. In such instances when at least one of the first disk blade bearing 86 or the second disk blade bearing 88 has failed, the control logic 200 (with respect to that corresponding disk blade 82, 84) proceeds to (218) at which the computing system 126 initiates one or more control actions when it determines that the corresponding disk blade bearing 86, 88 has failed. Conversely, when the differential load does not fall below or exceed the second threshold value, the control logic 200 returns to (202).

Moreover, at (218), the computing system 126 may be configured to initiate one or more control actions. For example, in some embodiments, the computing system 126 may be configured to initiate notification of the operator of the agricultural implement 10 that one or more of the disk blade bearings 86, 88 have failed. In this respect, the computing system 126 may be configured to initiate notification of the operator of the agricultural implement 10 that the first disk blade bearing 86 has failed and/or the second disk blade bearing 88 has failed. In such embodiments, the computing system 126 may transmit control signals to the user interface 134 via the communicative link 128. Such control signals may, in turn, instruct the user interface 134 to provide a visual or audible notification to the operator that one or more of the disk blade bearings 86, 88 have failed. In one embodiment, the notification may indicate which one of the disk blade bearings 86, 88 have failed. For example, the notification may indicate that the first disk blade bearing 86 and/or the second disk blade bearing 88 has failed.

Additionally, or alternatively, at (218), the computing system 126 may be configured to adjust the ground speed of the agricultural implement 10 (e.g., reduce the ground speed of or stop the agricultural implement 10). For example, the computing system 126 may transmit control signals to the engine 24, the transmission 26, and/or the braking actuator(s) 124 via the communicative link 128. Such control signals may, in turn, instruct the engine 24, the transmission 26, and/or the braking actuator(s) 124 to adjust the ground speed of the agricultural work vehicle 12 and, thus, the agricultural implement 10 (e.g., reduce the ground speed of or stop the agricultural implement 10). Moreover, other automatic control actions (e.g., adjusting force being applied to and/or the penetration depth of the disk blade assembly(ies) 46) may be initiated after it is determined that one or more of the disk blade bearings 86, 88 have failed. Upon completion of (218), the control logic 200 proceeds to (202).

Referring now to FIG. 6, a flow diagram of one embodiment of a method 300 for detecting disk blade bearing failure on an agricultural implement is illustrated in accordance with aspects of the present subject matter. In general, the method 300 will be described herein with reference to the agricultural implement 10, the agricultural work vehicle 12, and the system 100 described above with reference to FIGS. 1-5. However, it should be appreciated by those of ordinary skill in the art that the disclosed method 300 may generally be implemented with any agricultural implement having any suitable implement configuration, with any agricultural work vehicle having any suitable vehicle configuration, and/or within any system having any suitable system configuration. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 6, at (302), the method 300 includes receiving, with a computing system, first load sensor data indicative of a first load being applied to a fastener at a forward side of a frame member by a disk blade assembly of an agricultural implement. For instance, as described above, the computing system 126 may be configured to receive first load sensor data from the first load sensor(s) 118 via the communicative link 128. The received first load sensor data is, in turn, indicative of a first load(s) being applied to the fastener(s) 102 at the forward side 68 of the frame member 44 by the disk blade assembly(ies) 46.

Furthermore, at (304), the method 300 includes receiving, with a computing system, second load sensor data indicative of a second load being applied to the fastener at an aft side of the frame member by the disk blade assembly. For instance, as described above, the computing system 126 may be configured to receive second load sensor data from the second load sensor(s) 120 via the communicative link 128. The received second load sensor data is, in turn, indicative of a second load(s) being applied to the fastener(s) 102 at the aft side 72 of the frame member 44 by the disk blade assembly(ies) 46.

Additionally, at (306), the method 300 includes determining, with the computing system, when at least one of a first disk blade bearing or a second disk blade bearing has failed based on the received first and second load sensor data. For instance, as described above, the computing system 126 may be configured to analyze the received first and second load sensor data to determine when one or more of the disk blade bearings 86, 88 have failed.

Moreover, at (308), the method 300 includes initiating, with the computing system, a control action when it is determined that at least one of the first disk blade or the second disk blade bearings have failed. For instance, as described above, the computing system 126 may be configured to initiate one or more control actions when it is determined that one or more of the disk blade bearings 86, 88 have failed. Such control action(s) may include providing a notification to the operator, adjusting the ground speed of the agricultural implement 10, and/or the like.

It is to be understood that the steps of the control logic 200 and the method 300 are performed by the computing system 126 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing system 126 described herein, such as the control logic 200 and the method 300, is implemented in software code or instructions which are tangibly stored on a tangible computer readable medium. The computing system 126 loads the software code or instructions via a direct interface with the computer readable medium or via a wired and/or wireless network. Upon loading and executing such software code or instructions by the computing system 126, the computing system 126 may perform any of the functionality of the computing system 126 described herein, including any steps of the control logic 200 and the method 300 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. An agricultural implement, comprising:
a frame extending in a longitudinal direction between a forward end of the frame and an aft end of the frame, the frame further extending in a lateral direction between a first side of the frame and a second side of the frame, the frame including a frame member;
a disk blade assembly supported on the frame, the disk blade assembly including a hanger coupled to the frame member and a first disk blade and a second disk blade rotatably coupled to the hanger;
a fastener coupling the hanger to the frame member;
a first load sensor in operative association with the fastener, the first load sensor configured to generate data indicative of a first load being applied to the fastener at a forward side of the frame member by the disk blade assembly;
a second load sensor in operative association with the fastener, the second load sensor configured to generate data indicative of a second load being applied to the fastener at an aft side of the frame member by the disk blade assembly; and
a computing system communicatively coupled to the first and second load sensors, the computing system configured for:
determining the first load being applied to the fastener at the forward side of the frame member based on the data generated by the first load sensor;
determining the second load being applied to the fastener at the aft side of the frame member based on the data generated by the second load sensor; and
determining when at least one of a first disk blade bearing or a second disk blade bearing has failed based on the determined first and second loads.

2. The agricultural implement of claim 1, wherein:

the fastener extends in the longitudinal direction across a top surface of the frame member from the forward side to the aft side of the frame member;

the hanger comprises a forward arm and an aft arm; and the first disk blade is coupled to the forward arm and the second disk blade is coupled to the aft arm, wherein the first disk blade is separated from the second disk blade along the longitudinal direction.

3. The agricultural implement of claim 2, wherein:

the fastener comprises a U-bolt including a forward side adjacent to the forward side of the frame member, an aft side adjacent to the aft side of the frame member, and a top side extending from the forward side to the aft side and adjacent to the top surface of the frame member;

the first load sensor is configured to generate data indicative of a load being applied to the forward side of the U-bolt; and the second load sensor is configured to generate data indicative of a load being applied to the aft side of the U-bolt.

4. The agricultural implement of claim 1, wherein:

determining the first load comprises determining a first magnitude of the first load acting on the fastener in the longitudinal direction based on the data generated by the first load sensor;

determining the second load comprises determining a second magnitude of the second load acting on the fastener in the longitudinal direction based on the data generated by the second load sensor; and determining when the at least one of the first disk blade bearing or the second disk blade bearing has failed comprises determining a differential load between the first magnitude and the second magnitude.

5. The agricultural implement of claim 4, wherein determining when the at least one of the first disk blade bearing or the second disk blade bearing has failed comprises:

comparing the differential load to a threshold value; and determining that the at least one of the first disk blade bearing or the second disk blade bearing has failed in response to the differential load falling within or falling outside of the threshold value.

6. A system for detecting disk blade bearing failure on an agricultural implement, the system comprising:

a disk blade assembly supported on a frame member of a frame of the agricultural implement, the frame extending in a longitudinal direction between a forward end of the frame and an aft end of the frame, the frame further extending in a lateral direction between a first side of the frame and a second side of the frame, the disk blade assembly including a hanger coupled to the frame member and a first disk blade and a second disk blade rotatably coupled to the hanger;

a fastener coupling the hanger to the frame member;

a first load sensor in operative association with the fastener, the first load sensor configured to generate data indicative of a first load being applied to the fastener at a forward side of the frame member by the disk blade assembly;

a second load sensor in operative association with the fastener, the second load sensor configured to generate data indicative of a second load being applied to the fastener at an aft side of the frame member by the disk blade assembly; and a computing system communicatively coupled to the first and second load sensors, the computing system configured for:

determining the first load being applied to the fastener at the forward side of the frame member based on the data generated by the first load sensor;

determining the second load being applied to the fastener at the aft side of the frame member based on the data generated by the second load sensor; and determining when at least one of a first disk blade bearing or a second disk blade bearing has failed based on the determined first and second loads.

7. The system of claim 6, wherein:

the fastener extends in the longitudinal direction across a top surface of the frame member from the forward side to the aft side;

the hanger comprises a forward arm and an aft arm; and the first disk blade is coupled to the forward arm and the second disk blade is coupled to the aft arm, wherein the first disk blade is separated from the second disk blade along the longitudinal direction.

8. The system of claim 6, wherein:

determining the first load comprises determining a first magnitude of the first load acting on the fastener in the longitudinal direction based on the data generated by the first load sensor;

determining the second load comprises determining a second magnitude of the second load acting on the fastener in the longitudinal direction based on the data generated by the second load sensor; and determining when the at least one of the first disk blade bearing or the second disk blade bearing has failed comprises determining a differential load between the first magnitude and the second magnitude.

9. The system of claim 8, wherein determining when the at least one of the first disk blade bearing or the second disk blade bearing has failed comprises:

comparing the differential load to a first threshold value; and determining that the at least one of the first disk blade bearing or the second disk blade bearing has at least worn in response to the differential load falling within or falling outside of the first threshold value.

10. The system of claim 9, wherein the computing system is further configured to:

notify an operator of the agricultural implement in response to determining that the at least one of the first disk blade bearing or the second disk blade bearing has at least worn.

11. The system of claim 9, wherein determining when the at least one of the first disk blade bearing or the second disk blade bearing has failed further comprises:

comparing the differential load to a second threshold value that is greater than the first threshold value; and determining that the at least one of the first disk blade bearing or the second disk blade bearing has failed in response to the differential load falling within or falling outside of the second threshold value.

12. The system of claim 11, wherein the computing system is further configured to initiate a control action in response to determining that the at least one of the first disk blade bearing or the second disk blade bearing has failed.

13. The system of claim 12, wherein initiating the control action comprises notifying an operator of the agricultural implement that the at least one of the first disk blade bearing or the second disk blade bearing has failed.

14. The system of claim 12, wherein initiating the control action comprises adjusting a ground speed of the agricultural implement.

15. A method for detecting disk blade bearing failure on an agricultural implement, the agricultural implement includes a disk blade assembly supported on a frame member of the agricultural implement, the disk blade assembly including a hanger and a first disk blade and a second disk blade rotatably coupled to the hanger, the agricultural implement further including a fastener coupling the hanger to the frame member, the method comprising:

receiving, with a computing system, first load sensor data indicative of a first load being applied to the fastener at a forward side of the frame member by the disk blade assembly;

determining, with the computing system, the first load being applied to the fastener at the forward side of the frame member based on the received first load sensor data;

receiving, with the computing system, second load sensor data indicative of a second load being applied to the fastener at an aft side of the frame member by the disk blade assembly;

determining, with the computing system, the second load being applied to the fastener at the aft side of the frame member based on the received second load sensor data;

determining, with the computing system, when at least one of a first disk blade bearing or a second disk blade bearing has failed based on the determined first and second loads; and initiating, with the computing system, a control action in response to determining that the at least one of the first disk blade bearing or the second disk blade bearing has failed.

16. The method of claim 15, wherein:

determining the first load comprises determining, with the computing system, a first magnitude of the first load acting on the fastener in a longitudinal direction based on the received first load sensor data;

determining the second load comprises determining, with the computing system, a second magnitude of the second load acting on the fastener in the longitudinal direction based on the received second load sensor data; and determining when the at least one of the first disk blade bearing or the second disk blade bearing has failed comprises determining, with the computing system, a differential load between the first magnitude and the second magnitude.

17. The method of claim 16, wherein determining when the at least one of the first disk blade bearing or the second disk blade bearing has failed further comprises:

comparing, with the computing system, the determined differential load to a first threshold value; and determining, with the computing system, that the at least one of the first disk blade bearing or the second disk blade bearing has at least worn in response to the differential load falling within or falling outside of the first threshold value.

18. The method of claim 17, wherein initiating the control action comprises:

notifying, with the computing system, an operator of the agricultural implement in response to determining that the at least one of the first disk blade bearing or the second disk blade bearing has at least worn.

19. The method of claim 17, wherein determining when the at least one of the first disk blade bearing or the second disk blade bearing has failed further comprises:

comparing, with the computing system, the differential load to a second threshold value that is greater than the first threshold value in response to determining that the at least one of the first disk blade bearing or the second disk blade bearing has at least worn; and determining, with the computing system, that the at least one of the first disk blade bearing or the second disk blade bearing has failed in response to the differential load falling within or falling outside of the second threshold value.

20. The method of claim 15, wherein initiating the control action comprises notifying an operator of the agricultural implement that the at least one of the first disk blade bearing or the second disk blade bearing has failed.

\* \* \* \* \*